United States Patent [19]
Budal et al.

[11] 4,203,294
[45] May 20, 1980

[54] SYSTEM FOR THE CONVERSION OF SEA WAVE ENERGY

[76] Inventors: Kjell Budal, Planetvegen 33 B; Johannes Falnes, Planetvegen 52, both of 7000 Trondheim, Norway

[21] Appl. No.: 887,128

[22] Filed: Mar. 16, 1978

[30] Foreign Application Priority Data

Mar. 22, 1977 [NO] Norway ................................ 771013

[51] Int. Cl.² ............................................. F03B 13/12
[52] U.S. Cl. ....................................... 60/497; 417/331
[58] Field of Search ................................... 60/495–507; 417/330–333, 337; 290/42, 43, 53, 54

[56] References Cited
U.S. PATENT DOCUMENTS

| | | | |
|---|---|---|---|
| 1,665,140 | 4/1928 | Master | 417/331 |
| 3,126,830 | 3/1964 | Dilliner | 417/331 |
| 3,668,412 | 6/1972 | Vrana et al. | 290/53 |
| 4,076,463 | 2/1978 | Welczer | 60/499 X |

*Primary Examiner*—Allen M. Ostrager
*Attorney, Agent, or Firm*—Watson, Cole, Grindle & Watson

[57] ABSTRACT

A system for conversion of sea wave energy to useful energy comprising a water displacing member adapted to be at least in part submerged in the sea and mechanically secured to solid ground and provided with means to so control the movement of the water displacing member that it is locked relative to the ground during selected time periods of each cycle of such waves to which the water displacing member is subjected, for the purpose of thereby controlling the rotational movement of an electric generator through at least one fluid under controlled circulation within the water displacing member.

6 Claims, 8 Drawing Figures

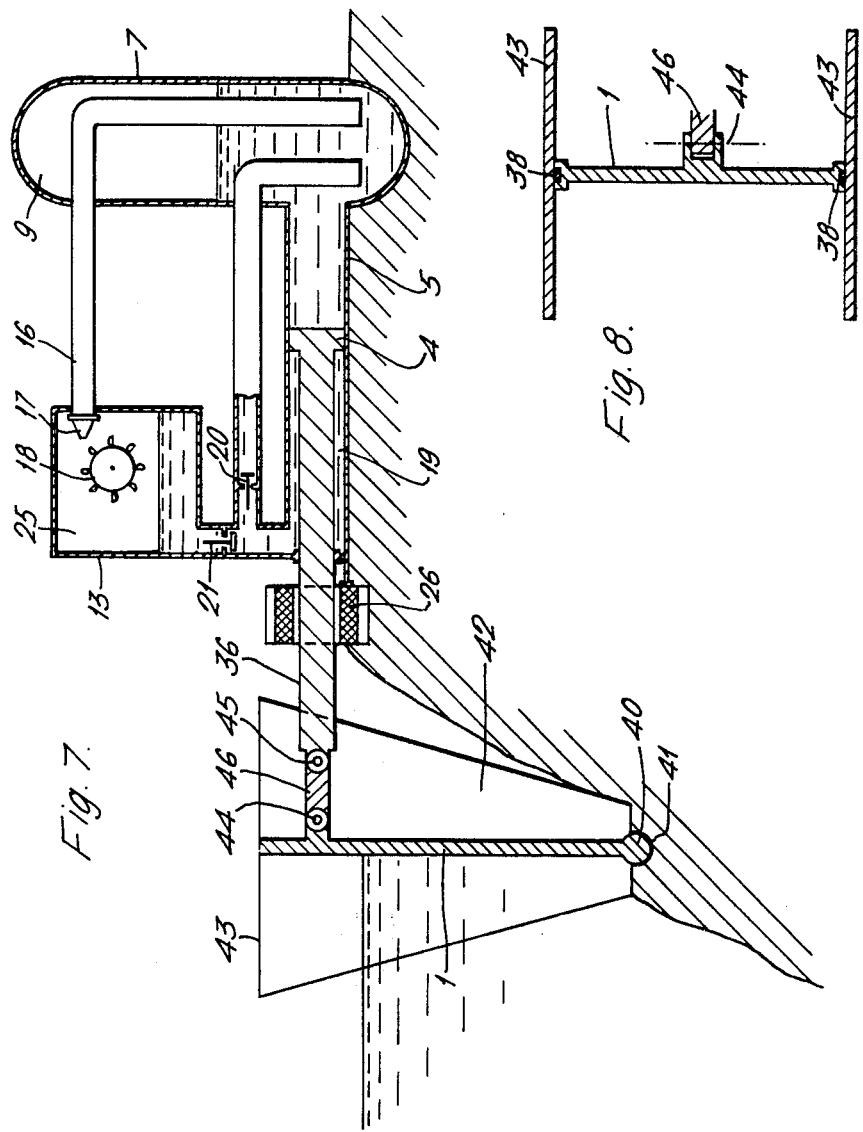

SYSTEM FOR THE CONVERSION OF SEA WAVE ENERGY

BACKGROUND

1. Field of the Invention

The present invention relates to apparatus adapted to absorb or to utilize the energy of sea waves.

2. Prior Art

To that end many different types of apparatus have already been proposed, comprising a floating or submerged moveable, water displacing member, mounted on devices connected to land or to the sea bottom, and which oscillates in step with the fluctuating force from the wave. Such a water displacing member may, for instance, be a floating bouy which performs vertical oscillations in the sea. The disadvantage of most previously proposed apparatus is that the displacement of a member is essentially in step with the displacement of the wave at the location of the member, i.e. that the displacement curve of the member in time essentially coincides with the local elevation curve of the sea. As a result, part of the power which the member absorbs from the wave during one part of the oscillation cycle is lost during another, i.e. the member is an inefficient wave power absorber. However, significantly improved efficiency can be obtained if the velocity curve of the member, instead of following the displacement curve, is made to coincide in time with the local elevation curve of the sea. This means that said displacement curve must be properly delayed with respect to the elevation curve of the sea. Moreover, additional improved efficiency is obtained if also the magnitude of the displacement of the water displacing member is controlled relative to the magnitude of the wave.

SUMMARY OF THE INVENTION

These optimum conditions are illustrated schematically in FIG. 1, wherein curve A illustrates the time evolvement of the force on the buoy and curve C the optimum displacement curve for the buoy. For the sake of simplicity it is assumed that the incident wave is harmonic. It has been found technically complicated to obtain the optimum motion C in a constantly changing sea. However, by means of the present invention, the approximate optimum displacement curve B can be obtained by relatively simple technical means, i.e. by maintaining the position of the buoy over controlled time periods.

With reference to FIG. 1, the motion of the buoy is controlled in the following way: At the time $t_a$, slightly before the wave force on the buoy culminates the buoy is set free to move fairly rapidly upwards. At the time $t_c$ when the buoy reaches its upper position and its velocity is zero, its position is fixed. This position of the buoy is maintained until the time $t_d$ when the wave force approaches its largest negative value, at which time the buoy is set free to move fairly rapidly downwards. At the time $t_f$ when the buoy reaches its lowest position and its velocity is zero, its position is again fixed. The buoy is kept fixed until the time $t_g$, from which time the cycle repeats itself. It is to be noted that the velocity of the buoy always has the same sign as the excitation force from the wave, which implies that power is always transferred from the wave to the buoy and not vice versa. Moreover the buoy moves upwards when the force from the wave is largest in that direction and moves downwards when the force downwards is maximum. This control of the movement of the buoy is hereafter called phase control. This is one of the conditions for absorbing maximum power from the wave.

Also the maximum displacement of the buoy must be controlled relative to the wave amplitude (amplitude control). This is established by controlling the magnitude of the damping of the movement. The damping may, for instance, be obtained by letting the linear movement of the buoy, by means of proper mechanical means, establish a forced rotation of an electric generator, i.e. the damping of the motion represents the useful power output. The curve B of FIG. 1 is thus characterized by the fact that the displacement of the buoy is controlled relative to the time evolvement of the incident wave, both with respect to phase and amplitude, to the effect that approximately maximum power absorption is obtained.

In order to obtain the displacement curve B in FIG. 1, the position of the buoy must be fixed over proper periods during the wave cycle and the present invention relates to apparatus adapted to achieve this aim. An apparatus of this kind may, for instance, be a buoy containing a hydraulic cylinder-piston device where the piston is fixed to a wire, chain or rod rigidly connected to the seabed. The buoy is forced to be partly submerged in its equilibrium position by connecting the cylinder-piston device to a pressure vessel establishing an equilibrium force on the wire, chain or rod. The body may then be kept in a fixed vertical position by locking the piston to the cylinder by a brake or a valve.

The apparatus may also be of the kind where the water displacing member, being partly or fully submerged and being connected to the seabed or to the shore, operates with controlled rolling motions or controlled horizontal motions, or any other controlled motions in response to the corresponding wave forces, as illustrated by the curves B and A of FIG. 1. The necessary phase control is established by a a locking mechanism, for instance a clutch or a brake, or by a valve in a hydraulic system.

In the present invention the locking mechanism and the damping mechanism are controlled by a computer, receiving signals from one or several wave transducers being placed at a distance from the water displacing buoy or directly on the buoy. This is considered to be obvious technology forming no part of the invention, and is therefore not described and shown.

BRIEF DESCRIPTION OF THE DRAWINGS

In the accompanying drawings it is schematically shown how apparatus can be made in order to achieve the optimum absorption of wave power, as described above.

FIG. 7 is a similar view of an apparatus wherein the water displacing member is a wall which can be tilted about an axis, the swing angle being adjustably set by a brake; and FIG. 8 is a detail view of a portion of FIG. 7.

DETAILED DESCRIPTION

Figure 1:
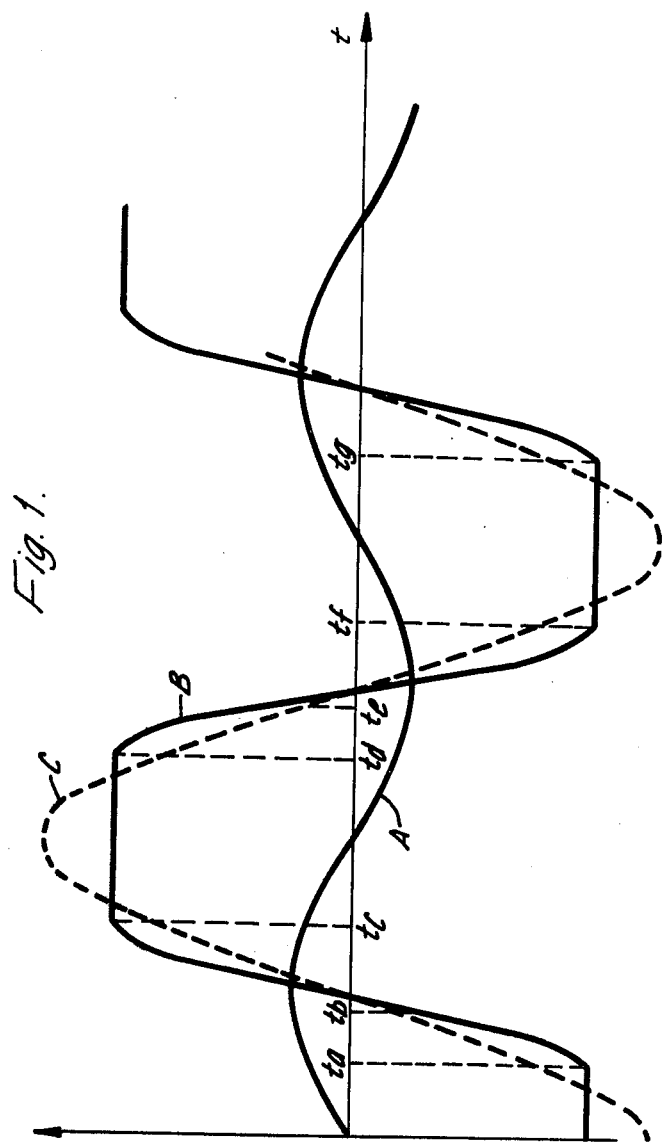
FIG. 1 illustrates the operating principle of the invention.

In the description of the different examples of the present invention, reference is made to the curves and the times indicated in FIG. 1. In all figures identical reference numerals are used in connection with parts which correspond to each other.

In the FIGS. 2 to 5, 1 is a floating body which is held in a partly submerged equilibrium position in the sea, i.e. when there are no waves, by a wire or cable 2 which, at one end is secured to the sea bed 3 and at the other end is connected to a piston 4 of a hydraulic piston-cylinder device 5 arranged inside the body 1, so that the piston 4 moves relatively to the cylinder 5 in dependence upon the position of the body 1 relative to the sea bed 3. The cable 2 is presumed to be maintained taut by the force applied to the lower face of the piston 4 by the pressure in a vessel 7 through a conduit which contains a turbine 10 and a valve 11. The fluid in the vessel 7 is placed under the pressure of a gas contained in the closed space 9 in the vessel 7. 6 is a ballast. The turbine 10 is connected to an electric generator 12.

Initially, it is presumed that the pressure in the space 9 is of such a value that the same, together with the weight of the body 1 including the ballast 6, maintain the body 1 half submerged in the sea. By means of the devices 10 and 11 the vertical movements of the body 1 may then be controlled. When the body is oscillating upwardly and downwardly in the sea, fluid is transferred into the vessel 7 and out of the same, respectively.

With reference to FIG. 1, the apparatus shown in FIG. 2 functions in the following way:

When the curve B passes through zero, the displacement of the buoy 1 relative to its equilibrium postion is zero, whereas the excitation force from the wave, represented by curve A, is nearly maximum. Since the buoy at this moment has kinetic energy it will pass on beyond its equilibrium position and at the time $t_c$ reach a maximum displacement which may be considerably larger than the maximum elevation of the wave. At the time $t_c$, when the velocity of the buoy is zero, the valve 11 is closed. The buoyancy forces on the buoy will then hold it set in its upper position as long as the valve is closed. The ballast 6 of the buoy is so small that there is always tension in the mooring cable 2. At the time $t_d$, when the wave elevation around the buoy is approaching its lowest value, the valve 11 is opened. The hydraulic forces on the piston will then force the buoy to move fairly rapidly downwards.

When the buoy reaches its lowest position at the time $t_f$, the velocity then being zero, the valve 11 is again closed. The large buoyancy forces on the buoy in this submerged position will tend to move it upwards. However, the fluid column under the piston will prevent it from doing so and the buoy will therefore be fixed in its lower position as long as the valve 11 is closed. At the time $t_g$, the valve is opened and the next cycle starts.

The amplitude of the buoy 1 is controlled by the damping effect of the turbine 10. The magnitude of the damping is given by the load on the electric generator 12. It is to be noted that the turbine and the generator will have alternating velocities. The generator will therefore deliver a fluctuating electric power.

Figure 2:
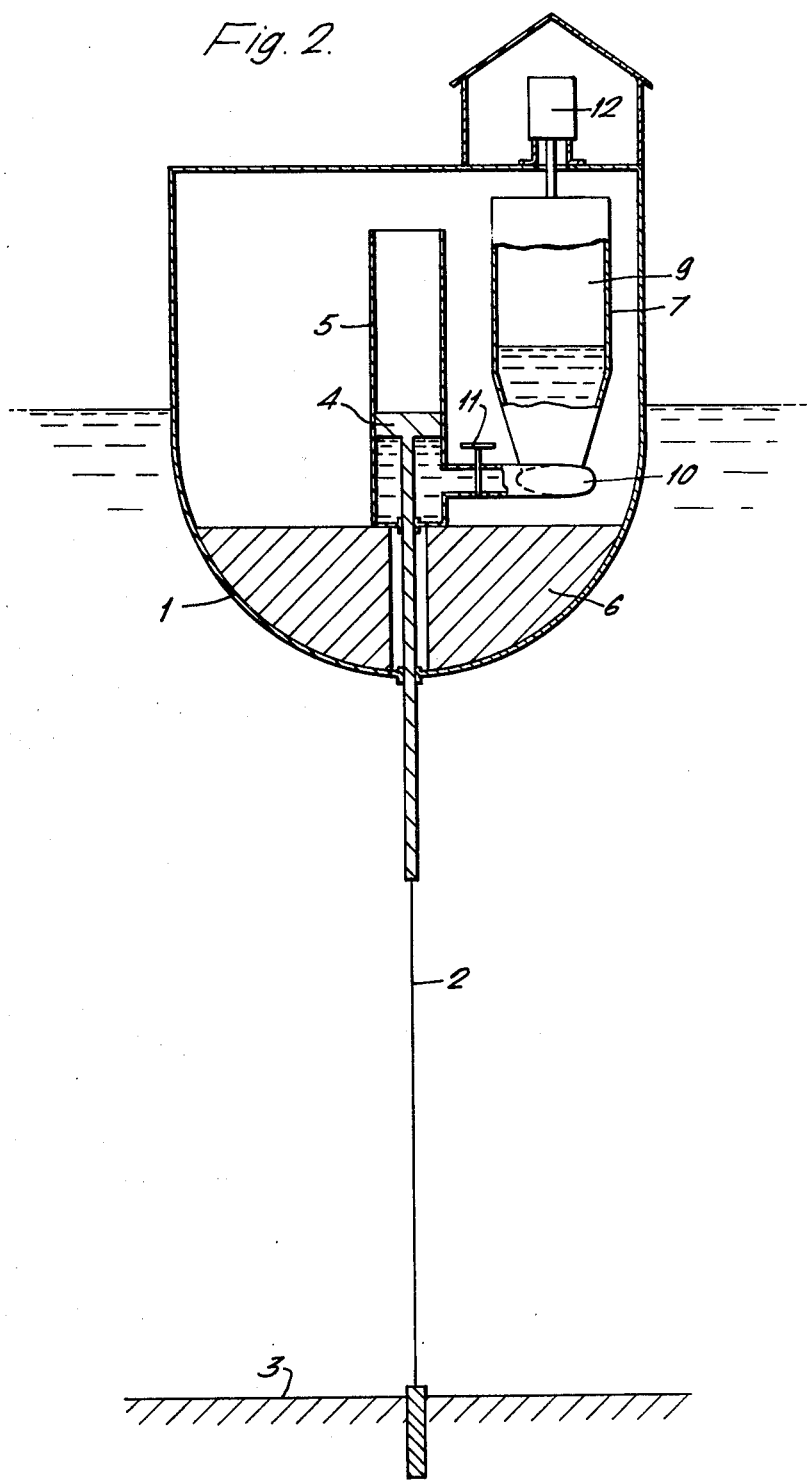
FIG. 2 is a sectional view of an apparatus, use being made of a single pressure vessel and a single valve.
Figure 3:
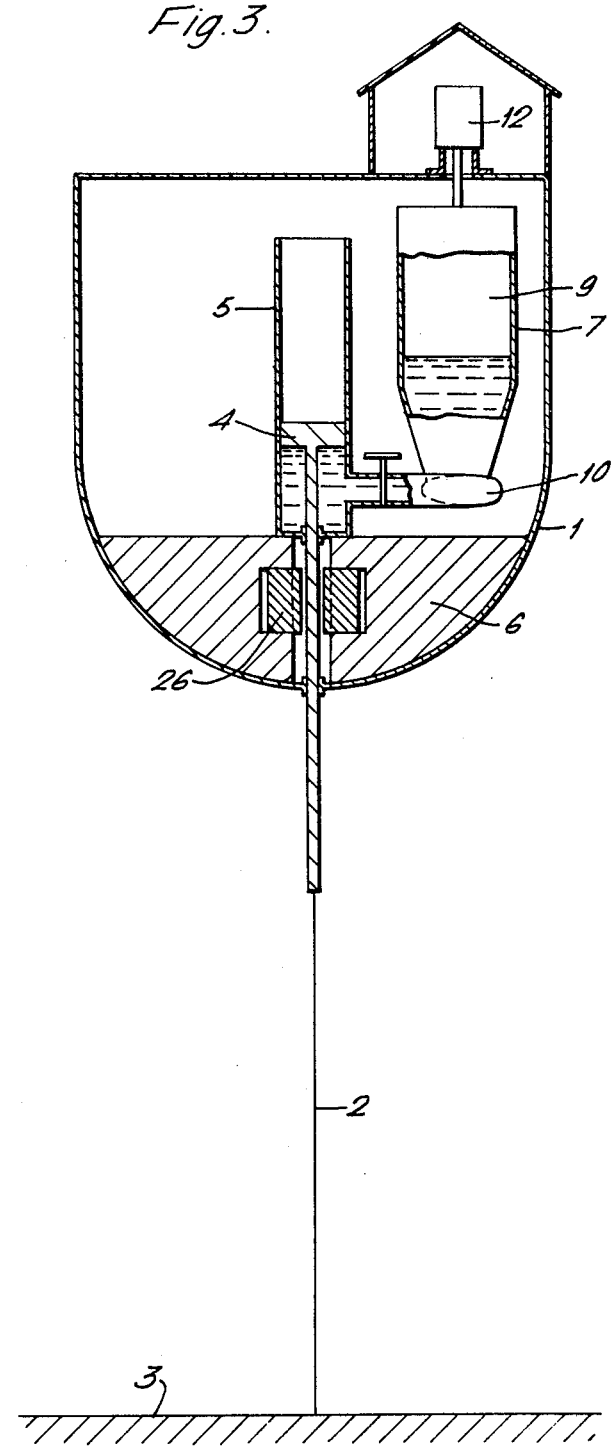
FIG. 3 is a similar view of an apparatus comprising a single pressure vessel, the locking mechanism being in the form of a brake.

FIG. 3 shows an apparatus which is identical to that of FIG. 2, except for the valve 11, which here is replaced by a brake or locking mechanism 26. This mechanism may be so activated as to set the relative position of the piston rod and the buoy 1 at the times $t_c$, $t_f$ etc. and deactivated at the times $t_a$, $t_d$, etc., with the same result as explained for the apparatus shown in FIG. 2.

Figure 4:
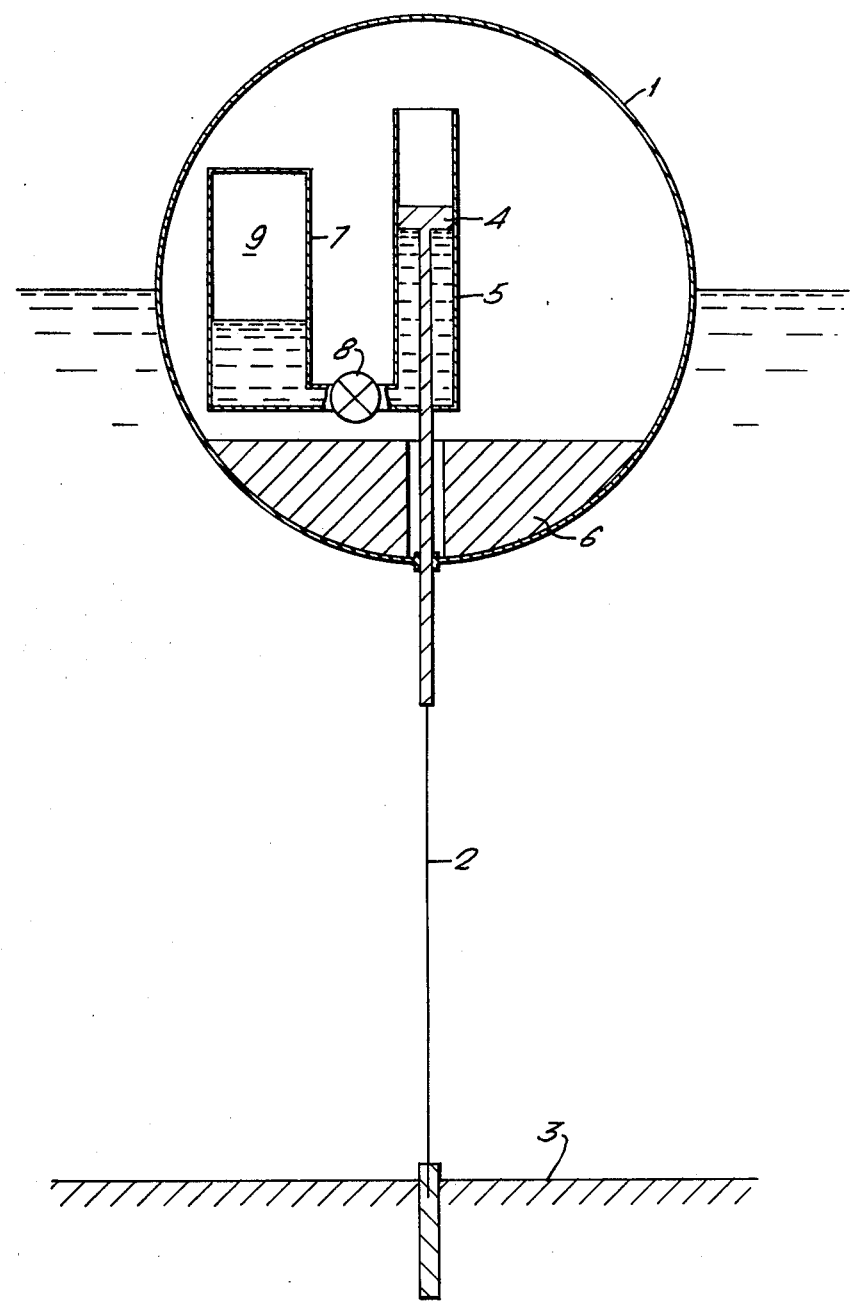
FIG. 4 is a similar view of an apparatus wherein the valve function is accomplished by a hydraulic axial piston motor with variable plate angle.

FIG. 4 shows an apparatus, where a device 8 combines the functions of the turbine 10 and the valve 11 of FIG. 2. The device 8 is a conventional hydraulic axial piston motor with variable displacement as known per se. The fluid flow through this device can be controlled by varying the tilting angle of a cylinder block. When the buoy 1 is in motion, fluid will pass through the device 8 and force its axis to rotate. The shaft of the motor 8 supports an electric generator, not shown, which produces useful power. When the buoy is approaching its highest or lowest position, the motor block of the device 8 is tilted to such an angle that no fluid can pass. The device then functions as a closed valve, with the results as described above, that the position of the buoy is fixed. At the proper time, as illustrated in FIG. 1, the tilting angle is changed in such a way that the buoy is free to move again. The device 8 may rotate with constant velocity, independent of the magnitude and the direction of the fluid flow. This makes it possible to connect the generator directly to a main network. The magnitude of the damping of the motion of the buoy is controlled through the load on the generator.

The buoy 1 in FIG. 4 is shaped like a sphere. This may be advantageous in order to minimize the torque on the buoy due to the waves.

Figure 5:
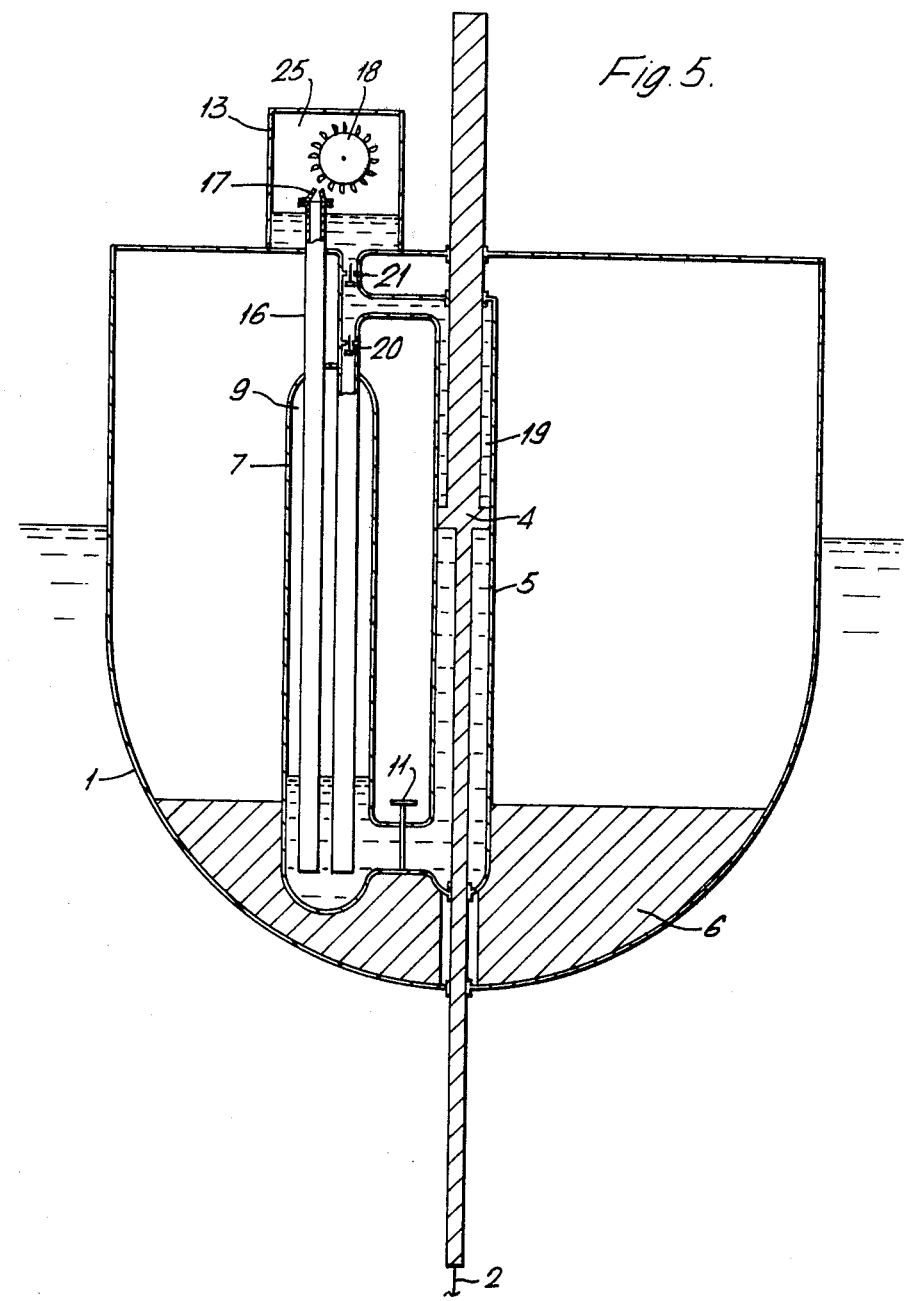
FIG. 5 is a similar view of an apparatus comprising a high pressure vessel and a low pressure vessel and three valves.

FIG. 5 shows an apparatus with two vessels and three valves. The high pressure vessel 7 and the valve 11 have exactly the same functions as in the apparatus of FIGS. 2 to 4. The high gas pressure in the vessel 7 gives the buoy 1 a partly submerged equilibrium position and the valve 11 is used to set the position of the buoy in controlled periods of the wave cycles, i.e. establish phase control. In this apparatus the amplitude control is obtained by means of the low pressure vessel 13 and the valves 21 and 22. The space 19 above the piston 4 may be connected to the vessel 7 through a valve 20, or to the vessel 13 through a valve 21. Due to the displacement of the buoy, fluid is pumped from the low pressure vessel 13 to the high pressure vessel 7 in the following manner: When the buoy is moving upwards, the valve 21 is open. Fluid will then be sucked from the vessel 13 into the space 19. When the buoy then moves downwards, the valve 21 is to be closed and valve 20 opened. Then fluid from the space 19 is forced into the vessel 7. The net result is that a certain amount of fluid is transferred from the low pressure vessel 13 to the high pressure vessel 7 during each oscillation cycle. This represents a certain amount of work which of course results in a damping of the motion of the buoy. In order to obtain full amplitude control, it is necessary to control the amount of fluid being transferred between the vessels 13 and 7 during each oscillation cycle. This can be done by means of the valves 20 and 21. With reference to FIG. 1, this may be done as follows: In the period $t_a - t_b$ valve 20 is open and valve 21 is closed. At the time $t_b$, valve 21 is opened while valve 20 is closed, and this situation remains so until the time $t_e$, when 20 is again opened and 21 closed etc. It will be noticed that for a given oscillation amplitude of the buoy, the amount of fluid transferred from the vessel 13 to the vessel 7 may be controlled by properly selecting the switching times $t_b$ and $t_e$. A maximum amount of fluid is transferred, and hence maximum damping is obtained, when $t_b = t_a$ and $t_e = t_d$. Negligible damping is obtained if $t_b$ and $t_e$ are the points in time when the buoy passes its equilibrium positions. Obviously, the damping of the buoy is determined in such a way that maximum power is absorbed from the waves.

The fluid transferred from vessel 13 to vessel 7 is, by means of the cylinder-piston arrangement and the valves 20 and 21, transferred back at a rate which is approximately constant, through the connecting tube 16. At the end of the tube 16 a needle valve 17 controls the amount of fluid entering the Pelton turbine wheel 18. The shaft of the Pelton wheel is connected to an electric generator which delivers useful power.

Figure 6:
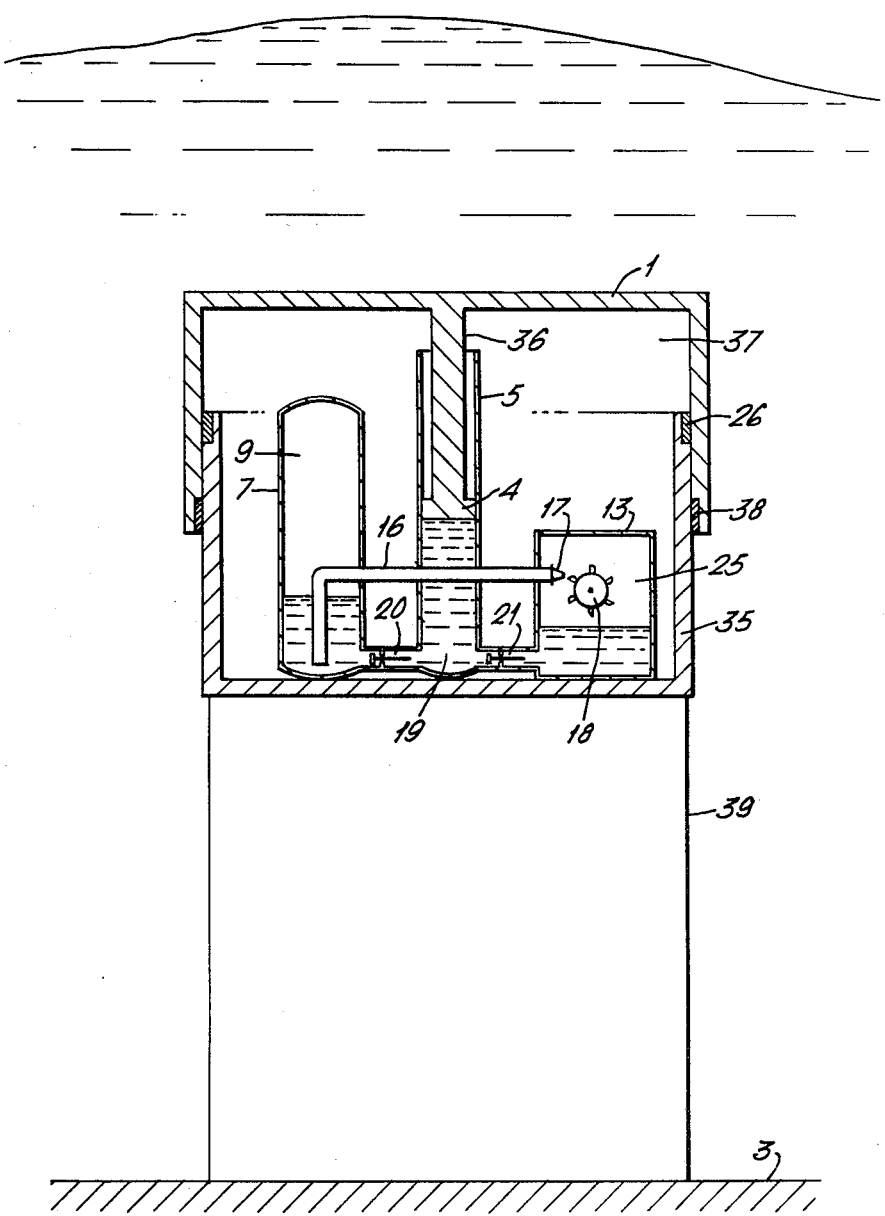
FIG. 6 is a similar view of a completely submerged apparatus, the volume of the same being controlled by locking means.

FIG. 6 shows a completely submerged apparatus according to the invention. The water displacing member 1 is of cylindrical shape and can move vertically with respect to a fixed cylinder 35. Between the cylinders is a fluid seal 38. The space 37 is filled with air or another gas. The water pressure on the water displacing member 1 is partly balanced by the gas pressure in the space 37 and partly by the pressure on the piston 4. The buoyancy of the apparatus and the mooring cables 39 will keep the cylinder 35 in a fixed vertical position. The phase control of the member 1 is established by locking the same relatively to the cylinder 35 during proper time periods by means of a brake or locking mechanism 26, as previously explained. The damping of the motion of the member 1 is obtained by means of the cylinder-piston arrangement, the vessels 7 and 13 and the valves 20 and 21, as explained above in relation to FIG. 5.

The apparatus of FIG. 6 is so situated that the water displacing member is subjected to vertical oscillations. It is also possible to so arrange a similar apparatus that the water displacing member is subjected to horizontal oscillations, for instance by placing the apparatus on a vertical rock wall beneath the surface of the water.

The cylindrical member 1 of the apparatus may also be replaced by a flexible wall, for instance a membrane. In that case the locking mechanism may be associated with the cylinder-piston system.

FIG. 7 shows another apparatus according to the invention, while FIG. 8 shows a horizontal sectional view of the water displacing member 1.

In this apparatus the water displacing member is an approximately vertical wall or plate 1, the lower edge of which presents a cylindrical surface 40 which may pivot in a bearing 41 supported on the rock beneath the surface of the water. Two fixed vertical walls or plates 43 are arranged at right angles to the plate 1. Water seals 38 may be arranged between the water displacing plate 1 and the stationary plates 43. The top edge of plate 1 is always above the water surface.

The oscillating angular movements of the plate 1 is transferred to an oscillating linear motion of a piston rod 36 through a rod 46 and bearings 44 and 45. Due to the wave the plate 1 is excited by a torque about the axis of the bearing 41 as indicated by curve A in FIG. 1. By means of the devices for obtaining proper phase control and amplitude control, an angular displacement of plate 1 is obtained as indicated by curve B in FIG. 1. Phase control is established by means of the locking mechanism 26, and amplitude control is established by means of the cylinder-piston arrangement, the vessels 7 and 13 and the valves 20 and 21 in the same way as explained for the device shown in FIG. 5.

We claim:

1. Apparatus for conversion of sea wave energy comprising a water displacing member which is adapted to be at least partially submerged in the sea, means for mechanically connecting said water displacing member to a fixed reference point, said connection means between said member and said reference point includes a locking mechanism adapted to hold said water displacing member at least approximately stationary relative to said reference point during selected time periods of each cycle of such waves to which the apparatus is subjected.

2. Apparatus as claimed in claim 1, wherein said locking mechanism is adapted to be activated at times near to the times when the velocity of said water displacing member is approximately zero.

3. Apparatus as claimed in claim 1, wherein said locking mechanism is adapted to be deactivated at times near to the time when the amplitude of the wave to which the apparatus is subjected has at least one of its extreme values.

4. Apparatus as claimed in any of the claims 1 to 3, wherein said locking mechanism is a mechanical device adapted to engage said connection means between said water displacing member and said reference point.

5. Apparatus as claimed in any of the claims 1 to 3, wherein said locking mechanism is at least one valve device included in a hydraulic cylinder-piston device mounted within said water displacing member and connected to said connection means.

6. Apparatus as claimed in claim 5, wherein said cylinder-piston device is included in a fluid circuit provided with valves adapted to alternately include a high-pressure vessel and a low-pressure vessel.

* * * * *